US011876307B2

(12) United States Patent
Tai et al.

(10) Patent No.: US 11,876,307 B2
(45) Date of Patent: Jan. 16, 2024

(54) ANTENNA STRUCTURE

(71) Applicant: Wistron NeWeb Corporation, Hsinchu (TW)

(72) Inventors: Chih-Feng Tai, Hsinchu (TW); Yang-Shun Liu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 157 days.

(21) Appl. No.: 17/488,524

(22) Filed: Sep. 29, 2021

(65) Prior Publication Data

US 2022/0336956 A1 Oct. 20, 2022

(30) Foreign Application Priority Data

Apr. 19, 2021 (TW) ................................ 110113982

(51) Int. Cl.
*H01Q 9/04* (2006.01)
*H01Q 1/48* (2006.01)
*H01Q 1/22* (2006.01)

(52) U.S. Cl.
CPC ............. *H01Q 9/0407* (2013.01); *H01Q 1/48* (2013.01); *H01Q 1/2291* (2013.01)

(58) Field of Classification Search
CPC ........ H01Q 1/2291; H01Q 1/48; H01Q 5/378; H01Q 5/392; H01Q 9/42; H01Q 9/0407–0492
See application file for complete search history.

(56) References Cited

U.S. PATENT DOCUMENTS 8,593,354 B2 * 11/2013 Tai ......................... H01Q 5/378 343/702
2008/0252533 A1 * 10/2008 Hung ....................... H01Q 1/38 343/700
2009/0096675 A1 * 4/2009 Huang ..................... H01Q 9/42 343/700 MS
2010/0019973 A1 * 1/2010 Yang ........................ H01Q 7/00 343/700 MS
2011/0037680 A1 * 2/2011 Chiu ...................... H01Q 5/378 343/893
2018/0123219 A1 * 5/2018 Kanazawa ............... H01Q 1/52 343/702

FOREIGN PATENT DOCUMENTS

TW M339094 U 8/2008

* cited by examiner

*Primary Examiner* — Ricardo I Magallanes
*Assistant Examiner* — Aladdin Abdulbaki
(74) *Attorney, Agent, or Firm* — McClure, Qualey & Rodack, LLP

(57) ABSTRACT

An antenna structure includes a radiating portion, a grounding portion, a connecting portion and a collaboration portion. The connecting portion is electrically connected between the radiating portion and the grounding portion. The connecting portion is provided for a feeding port to be disposed thereon for feeding a signal to the antenna structure. The collaboration portion is electrically connected to the grounding portion. The collaboration portion is coupling to the radiating portion and the connecting portion. The collaboration portion and the radiating portion are separated from each other. The collaboration portion and the connecting portion are separated from each other.

10 Claims, 8 Drawing Sheets

ANTENNA STRUCTURE

RELATED APPLICATIONS

This application claims the benefit of priority to Taiwan Patent Application No. 110113982, filed on Apr. 19, 2021. The entire content of the above identified application is incorporated herein by reference.

BACKGROUND

Technical Field

The present disclosure relates to an antenna structure, and particularly to a broadband antenna structure.

Description of Related Art

Driven by humans' pursuit of convenient life, a large number of device networking requirements have been generated. Therefore, wireless communication systems are developing towards higher transmission rates and throughput. For example, WIFI 6 simply increasing the utilization of 2.4 GHz and 5 GHz channels is still insufficient. To cope with the growth rate of the number of networked devices, WIFI 6E has added with a 6 GHz frequency band to solve the problem of channel congestion by adding channels. However, as the wireless communication system widens or increases the communication frequency band, it also means that the design complexity and cost of the radio frequency (RF) front-end unit will correspondingly increase. Therefore, how to reduce the design complexity and cost of the radio frequency front-end unit of the new generation wireless communication system has become a topic of concern in the market, and the design of the antenna structure is closely related to the topic.

In view of this, there is an urgent need for an antenna structure in the market, which can not only meet the wideness or increase of the communication frequency band of the wireless communication system but also effectively reduce the design complexity and cost of the RF front-end unit.

SUMMARY

According to an aspect of the present disclosure, an antenna structure is provided, which includes a radiating portion, a grounding portion, a connecting portion, and a collaboration portion. The connecting portion is electrically connected between the radiating portion and the grounding portion, and the connecting portion is provided for a feeding port to be disposed thereon for feeding a signal to the antenna structure. The collaboration portion is electrically connected to the grounding portion, the collaboration portion is coupling to the radiating portion and the connecting portion, the collaboration portion and the radiating portion are separated from each other, and the collaboration portion and the connecting portion are separated from each other.

According to another aspect of the present disclosure, an antenna structure is provided, which includes a radiating portion, a grounding portion, a connecting portion, and a collaboration portion. The radiating portion includes one or more radiating sections. The connecting portion is electrically connected between the radiating portion and the grounding portion, and the connecting portion is provided for a feeding port to be disposed thereon for feeding a signal to the antenna structure. The collaboration portion is electrically connected to the grounding portion. Each of the radiating portion, the grounding portion, the collaboration portion, and the collaboration portion is made of metal material. The connecting portion and the collaboration portion are flat-board-shaped. A normal direction of each of the connecting portion and the collaboration portion is parallel to a second direction. At least a part of the grounding portion and the radiating portion are flat-board-shaped. A normal direction of each of the at least a part of the grounding portion and the radiating portion is parallel to a third direction. A first direction, the second direction, and the third direction are perpendicular to each other. In this way, the three-dimensional antenna structure helps to meet the application requirements of wider frequency bands or newly added frequency bands without increasing the number of antennas and layout volume.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
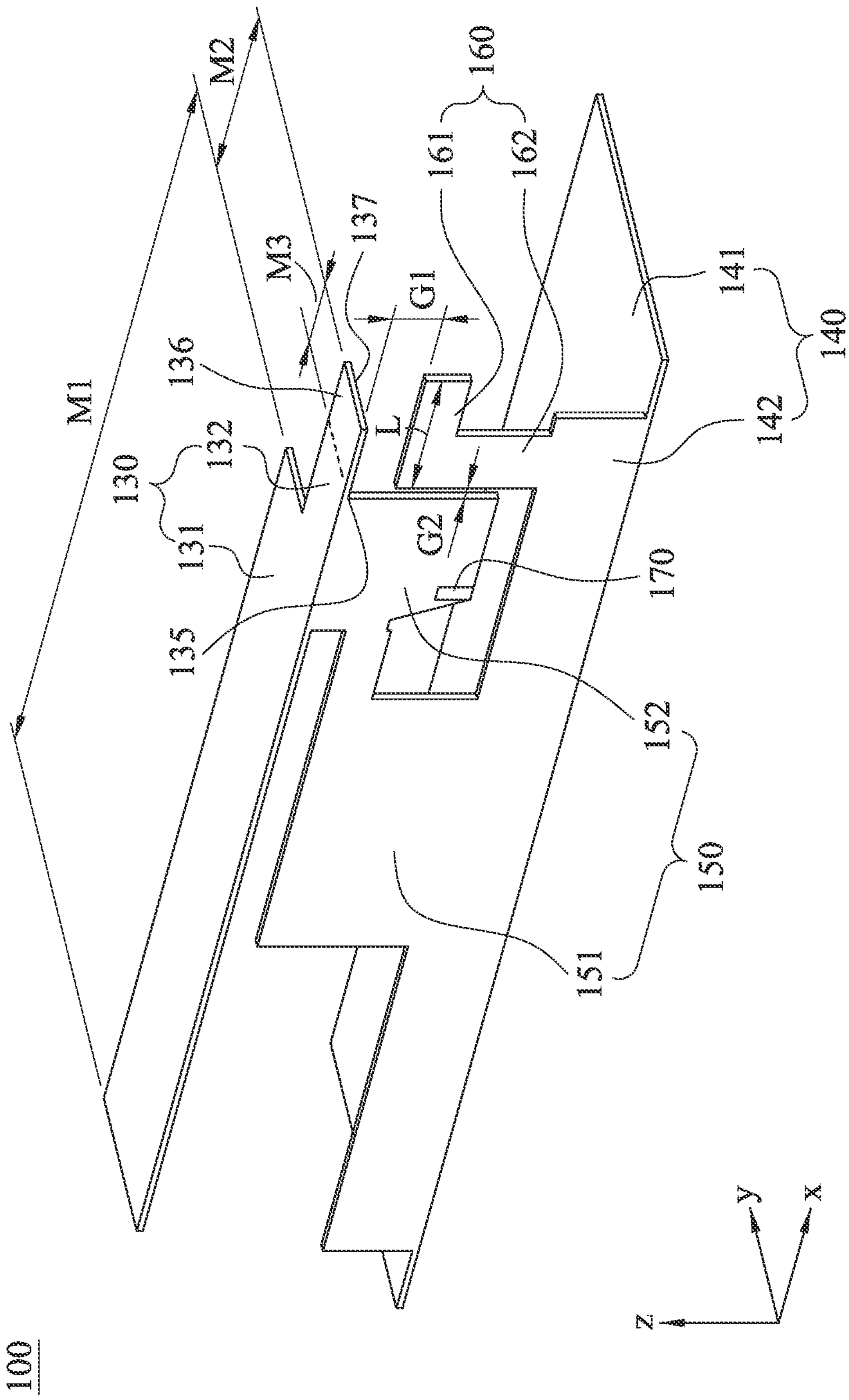
FIG. 1 is a three-dimensional view of the antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
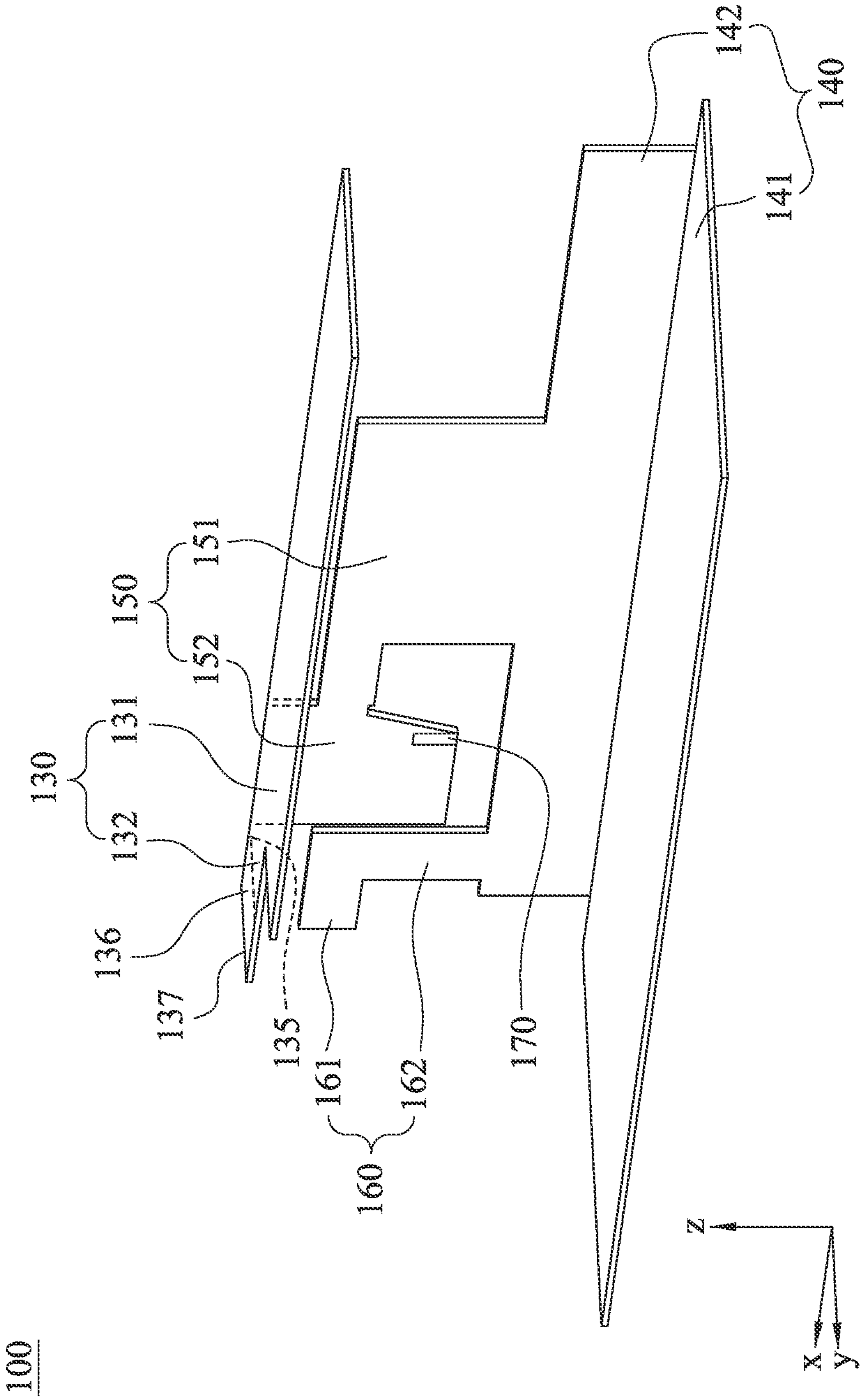
FIG. 2 is another three-dimensional view of the antenna structure in the embodiment of FIG. 1.

FIG. 1 is a three-dimensional view of an antenna structure 100 according to an embodiment of the present disclosure. FIG. 2 shows another three-dimensional view of the antenna structure 100 in the embodiment of FIG. 1. Referring to FIG. 1 and FIG. 2, the antenna structure 100 includes a radiating portion 130, a grounding portion 140, a connecting portion 150, and a collaboration portion 160. The connecting portion 150 is electrically connected between the radiating portion 130 and the grounding portion 140. The connecting portion 150 is provided for a feeding port 170 to be disposed thereon for feeding signals to the antenna structure 100 (It should be understood that the feeding port 170 can also be used to receive signals transmitted by the antenna structure 100). The collaboration portion 160 is electrically connected to the grounding portion 140. In addition, the term "connect" used herein refers to a physical connection between two elements, which can be a direct connection or an indirect connection. The term "couple" used herein refers to two elements being separated and having no physical connection, and an electric field generated by a current of one of the two elements excites that of the other one.

In detail, the collaboration portion 160 may be coupling to the radiating portion 130 and the connecting portion 150. And the collaboration portion 160 and the radiating portion 130 are separated from each other, and the collaboration portion 160 and the connecting portion 150 are separated from each other. Thereby, the antenna metal radiating path is increased through the collaboration portion 160. And through the mutual couplings among the collaboration portion 160, the connecting portion 150, and the radiating portion 130, the operating frequency band of the antenna structure 100 (for example, the voltage standing wave ratio corresponding to the frequency, namely VSWR, Voltage Standing Wave Ratio, is less than or equal to 2) not only contributed by the radiating portion 130 but also contributed by the coupling between the radiating portion 130 and the collaboration portion 160 and the coupling between the collaboration portion 160 and the connecting portion 150. Thereby, widening or adding the operating frequency band of the antenna structure 100, and further effectively reducing the number of antennas in wireless broadband communication products may be achieved. For example, the antenna structure 100 can be applied to a radio frequency front-end unit of a WIFI 6E system, through the radiating portion 130 to provide an operating frequency band of about 2.4 GHz (e.g., 2.4 GHz to 2.5 GHz) and about 5 GHz (e.g., 5.15 GHz to 5.85 GHz). And through the collaboration portion 160 coupling to the radiating portion 130 and the connecting portion 150 to extend the operating frequency band from about 5 GHz to cover 6 GHz (for example, 5.85 GHz to 7.125 GHz), that is, 2.4 GHz to 2.5 GHz and 5.15 GHz to 7.125 GHz that meet the requirements of the WIFI 6E standard, so that it meets the application requirements of the WIFI 6E system with increased channels without increasing the number of antennas and layout volume.

Figure 3:
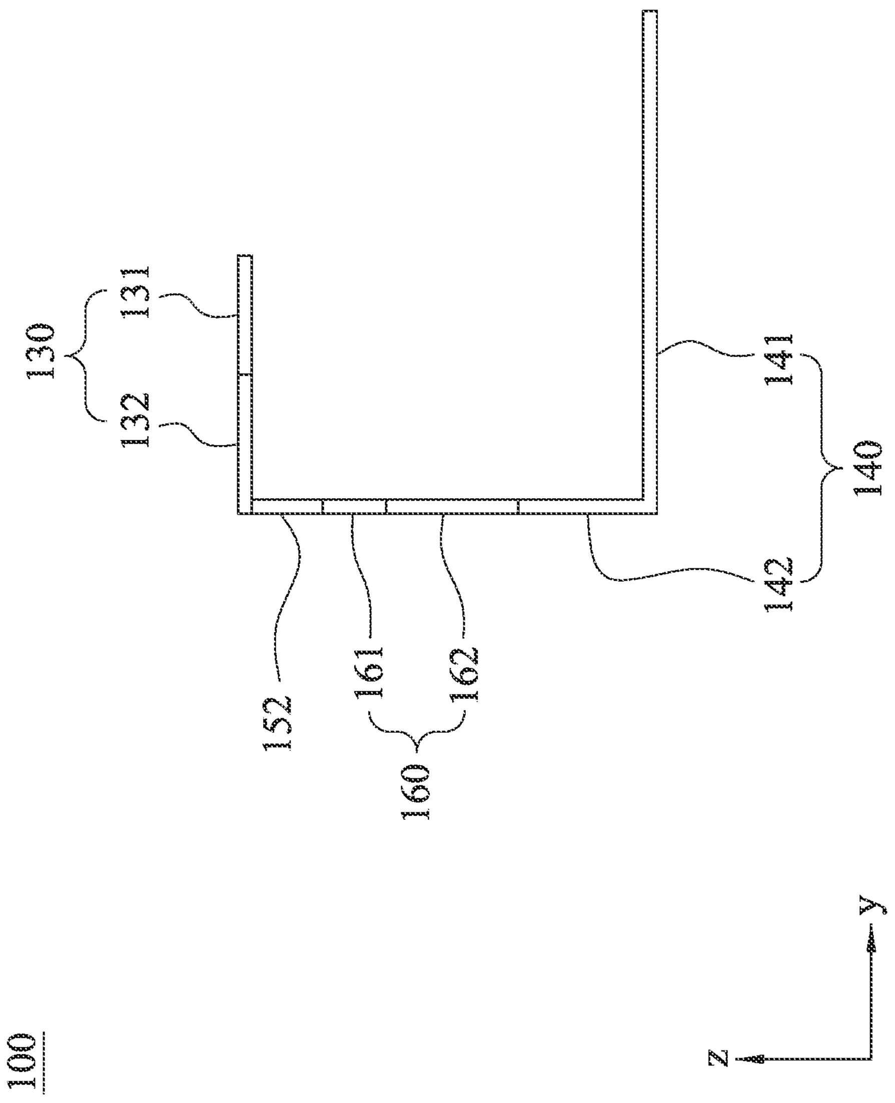
FIG. 3 is a side view of the antenna structure in the embodiment of FIG. 1.
Figure 4:
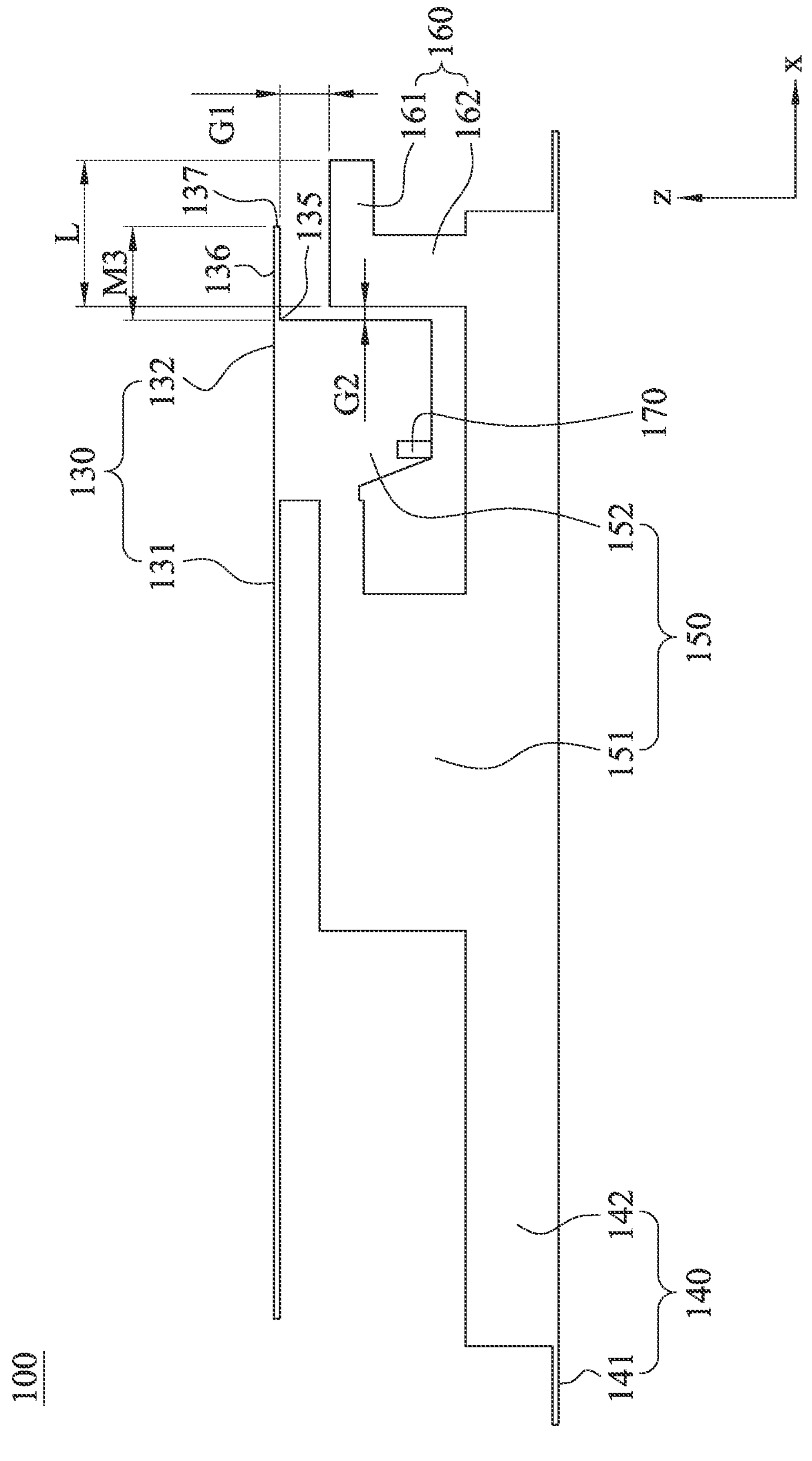
FIG. 4 is a front view of the antenna structure in the embodiment of FIG. 1.
Figure 5:
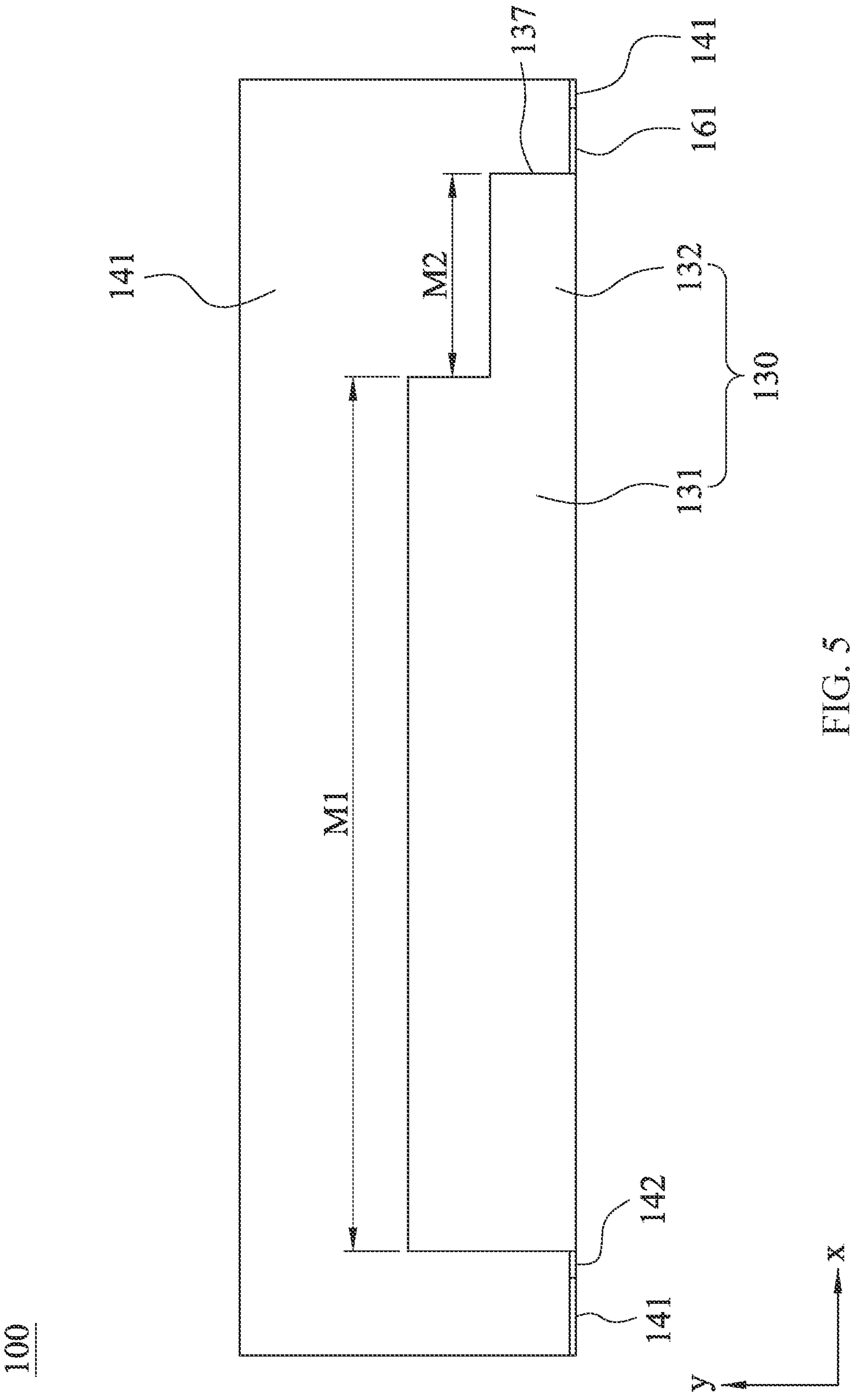
FIG. 5 is a top view of the antenna structure in the embodiment of FIG. 1.

FIG. 3 is a side view of the antenna structure 100 in the embodiment of FIG. 1, FIG. 4 is a front view of the antenna structure 100 in the embodiment of FIG. 1, and FIG. 5 is a top view of the antenna structure 100 in FIG. 1. It should be understood that the side view, front view, and top view shown in FIGS. 3 to 5 can be interchanged or adjusted as needed, and the assembly orientation of the antenna structure 100 is not limited thereby. Please refer to FIGS. 1 to 5, the radiating portion 130 may include one or more radiating sections. In this embodiment, the radiating portion 130 includes two radiating sections, namely a first radiating section 131 and a second radiating section 132. The first radiating section 131 and the second radiating section 132 are arranged along a first direction x and are directly electrically connected. The length of the first radiating section 131 along a second direction y and the length of the second radiating section 132 along the second direction y are different to distinguish the first radiating section 131 and the second radiating section 132. The length M1 of the first radiating section 131 is along the first direction x is greater than the length M2 of the second radiating section 132 along the first direction x. The second radiating section 132 is coupling to the collaboration portion 160. In this way, the coupling between a plurality of metal radiators can be used to excite energy in various frequency bands to reach the ultra-wideband and multi-functional frequency band antenna structure 100. Furthermore, each of the first radiating section 131 and the second radiating section 132 is rectangular, the length M1 of the first radiating section 131 along the first direction x is greater than the length of the first radiating section 131 along the second direction y. And the length M2 of the second radiating section 132 along the first direction x is greater than the length of the second radiating section 132 along the second direction y, so that the operating frequency bands of the first radiating section 131 and the second radiating section 132 are respectively related to the lengths M1 and M2 along the first direction x. The operating frequency band of the first radiating section 131 is lower than the operating frequency band of the second radiating section 132, and the second radiating section 132 is closer than the first radiating section 131 and is coupling to the collaboration portion 160, thereby extending the operating frequency band of the second radiating section 132 to higher frequency band.

The second radiating section 132 may include an open segment 136 extending from a junction 135 between the second radiating section 132 and a second connecting section 152 of the connecting portion 150 to an open end 137. The length M3 of the open segment 136 along the first direction x is less than the length L of a first collaboration section 161 of the collaboration portion 160 along the first direction x. This is beneficial to adjust the frequency offset so that the operating frequency band falls within the desired frequency band. In this embodiment, the length M3 is 2.75 mm, and the length L is 4.5 mm.

The grounding portion 140 may include one or more ground sections. In this embodiment, the grounding portion 140 includes two grounding sections, namely a first grounding section 141 and a second grounding section 142. The first grounding section 141 and the second grounding section 142 are directly electrically connected and arranged perpendicular to each other. In this way, it is helpful to adjust the radiation characteristics of the antenna structure 100, such as the operating frequency band, the radiation field pattern, etc., to meet the requirements of the application. Furthermore, it should be understood that the areas of the first grounding section 141 and the second grounding section 142 or the size ratios to other elements in the antenna structure 100 are not limited to the disclosure of FIGS. 1 to 5.

The radiating portion 130, the grounding portion 140, the connecting portion 150, and the collaboration portion 160 can be made of metal material. Each of the radiating portion 130, the first grounding section 141, the second grounding section 142, the connecting portion 150, and the collaboration portion 160 may be flat-board-shaped (flat-sheet-shaped, or flat-plate-shaped). It may be a flat plate and thus a metal sheet, and the thicknesses of the metal sheets are not limited to the disclosure shown in FIGS. 1 to 5. Thereby, it is beneficial to reduce the manufacturing complexity of the antenna structure 100 and save the manufacturing cost.

The normal direction of each of the connecting portion 150, the collaboration portion 160, and the second grounding section 142 may be parallel to the second direction y, and the connecting portion 150, the collaboration portion 160, and the second grounding section 142 are all arranged on the same plane. The connecting portion 150 and the collaboration portion 160 are specifically arranged along the first direction x and are directly electrically connected to the second grounding section 142, respectively. That is, the second grounding section 142 is electrically connected between the connecting portion 150 and the collaboration portion 160. The normal direction of each of the radiating portion 130 and the first grounding section 141 may be parallel to a third direction z, and the first direction x, the second direction y, and the third direction z are perpendicular to each other. In this way, the three-dimensional antenna structure 100 helps to meet the application requirements of wider frequency bands or newly added frequency bands without increasing the number of antennas and the layout volume. Specifically, the antenna structure 100 is an integrally formed three-dimensional bent-metal-sheet antenna including the radiating portion 130, the grounding portion 140, the connecting portion 150, and the collaboration portion 160, the dielectric material of the antenna structure 100 is air, and the dielectric material is combined not limited to this.

The collaboration portion 160 and the second radiating section 132 may be located correspondingly to each other along the first direction x, that is, the projections of the collaboration portion 160 (especially the first collaboration section 161) and the second radiating section 132 onto the x-y plane along the first direction x are at least partially overlapped, or the coordinates of the first direction x thereof are at least partially the same. Thereby, the operating frequency band of the second radiating section 132 is beneficial to extend and widen toward high frequencies.

The connecting portion 150 may include one or a plurality of connecting sections. In this embodiment, the connecting portion 150 includes two connecting sections, namely a first connecting section 151 and the second connecting section 152. The first connecting section 151 and the second connecting section 152 are arranged along the first direction x and are electrically connected. The grounding portion 140, the first connecting section 151, and the second connecting section 152 are electrically connected in sequence. A part of the second connecting section 152 (for example, the part of the second connecting section 152 where the feeding port 170 is provided) is located closer to the grounding portion 140 than a part of the first connecting section 151 thereto. And the second connecting section 152 is provided for a feeding port (that is, a signal feeding position) 170. Thereby, the first radiating section 131 as a metal radiator is electrically connected to an extension from the feeding port 170, the current or energy resonates from the feeding port 170 to the first radiating section 131 to generate radiation energy in the 2.4 GHz to 2.5 GHz frequency band. The second radiating section 132 as a metal radiator is electrically connected to the extension from the feeding port 170, the current or energy resonates from the feeding port 170 to the second radiating section 132 to generate radiation energy in the 5.15 GHz to 5.85 GHz frequency band. Further, the metal radiator of the collaboration portion 160 extends from the second grounding section 142 to be respectively coupling to the second connecting section 152 and the second radiating section 132, which are extended from the feeding port 170, and resonates the 5.85 GHz to 7.125 GHz frequency band by the coupling method.

The second connecting section 152 provided with the feeding port 170 may be located closer to the collaboration portion 160 than the first connecting section 151 thereto. In this way, the energy coupling between the feeding signal of the second connecting section 152 and the collaboration portion 160 helps the antenna structure 100 to have a wider frequency band or a newly added frequency band.

Referring to FIG. 1, FIG. 4, and FIG. 5, the collaboration portion 160 may include one or more collaboration sections. In this embodiment, the collaboration portion 160 includes two collaboration sections, namely the first collaboration section 161 and a second collaboration section 162. The radiating section of the radiating portion 130 closest to the collaboration portion 160 is the second radiating section 132. And the length M2 of the second radiating section 132 along the first direction x may be greater than the length L of the first collaboration section 161 of the collaboration portion 160 along the first direction x. The length of the first collaboration section 161 of the collaboration portion 160 along the first direction x is L, which may satisfy the following condition: 4 mm≤L≤10 mm. This helps the antenna structure 100 to be applied to the radio frequency front-end unit of the WIFI 6E system. For example, when the dielectric material of the antenna structure 100 is air, the length M1 of the first radiating section 131 along the first direction x is about 26.05 mm, and its operating frequency band is about 2.4 GHz, the length M2 of the second radiating section 132 along the first direction x is about 6.05 mm, and its operating frequency band is about 5 GHz. In addition, the coupling between the first collaboration section 161 and the second connecting section 152, and the coupling between the first collaboration section 161 and the second radiating section 132, which can extend the operating frequency band of the antenna structure 100 from about 5 GHz to about 6 GHz, thereby based on an architecture of a planar inverted-F antenna (PIFA for short) formed by the radiating portion 130, the ground portion 140 and the connecting portion 150, in addition to supporting the original 2.4 GHz and about 5 GHz, it can also extend the operating frequency band from about 5 GHz to about 6 GHz, which helps the RF front-end unit of the WIFI 6E system. The engineering design of the unit is convenient and the cost of parts is saved so that the WIFI 6E system can solve the problem of channel blockage by directly adding channels.

Figure 6:
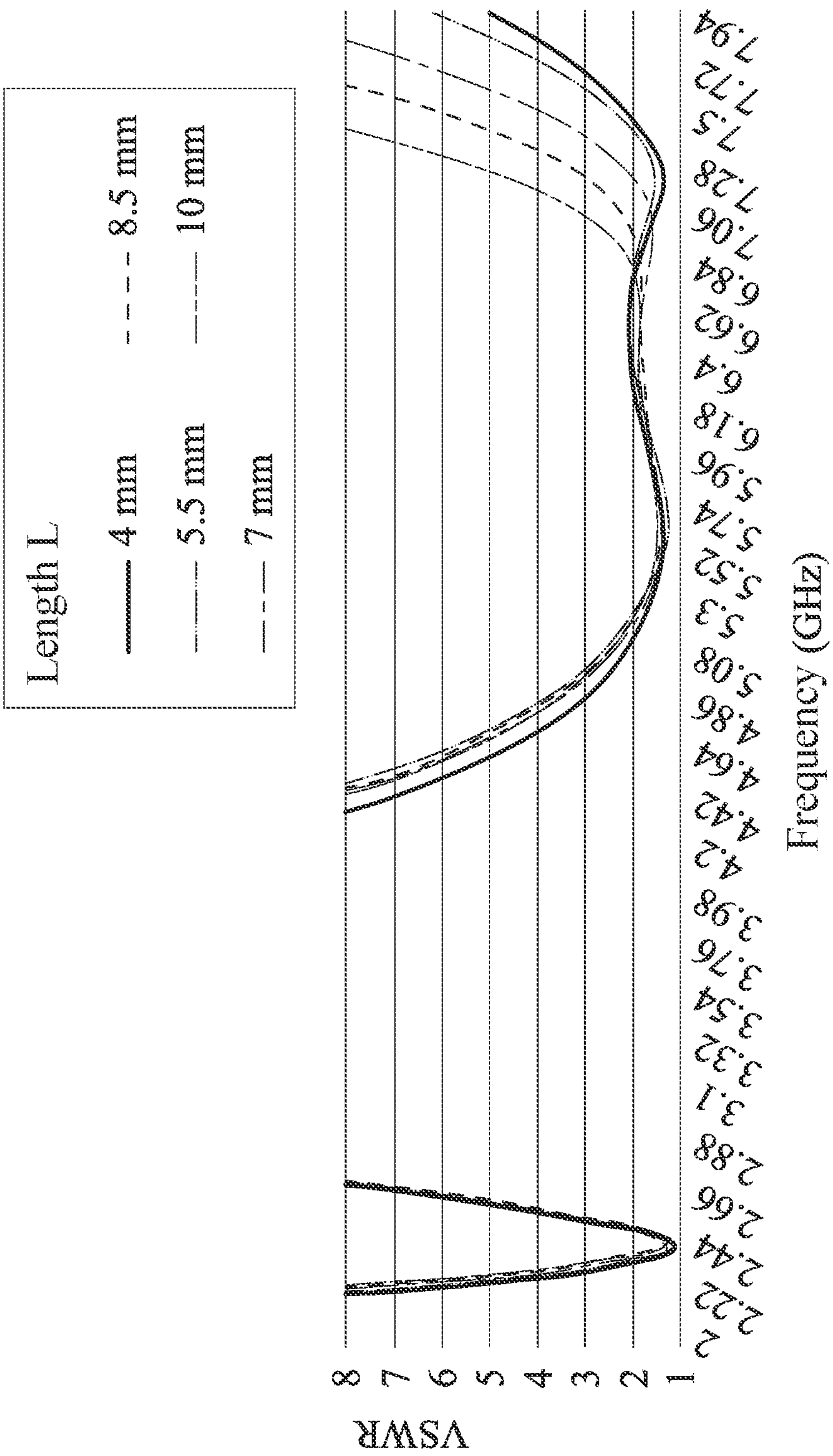
FIG. 6 is a frequency response diagram of the antenna structure in the embodiment of FIG. 1.

FIG. 6 shows a frequency response diagram of the antenna structure 100 in the embodiment in FIG. 1, specifically, the relationship diagram between the frequency and the voltage standing wave ratio of the antenna structure 100 with different lengths L. Please refer to FIGS. 1 and 6, the antenna structure 100 can provide operating frequency bands from 2.4 GHz to 2.5 GHz and 5.15 GHz to 7.125 GHz that meet the requirements of the WI FI 6E standard, where the voltage standing wave ratio of the operating frequency band is less than or equal to 2. According to a specific configuration of this embodiment, when the dielectric material of the antenna structure 100 is air, the length M1 is 26.05 mm, the length M2 is 6.05 mm, the gap G1 is 0.5 mm, and the gap G2 is 0.5 mm, the length L of the first collaboration section 161 is adjusted along the first direction x, the operating frequency band of about 2.4 GHz contributed by the first radiating section 131 is relatively unaffected, while the second radiating section 132 coupling to the first collaboration section 161 contributes about 5 GHz, and its extended and widened operating frequency band towards high frequencies (i.e., about 6 GHz) changes significantly with the length L in the voltage standing wave ratio and impedance matching. The electrical length of the collaboration portion 160 can be related to ¼ wavelength of the operating frequency.

Please refer to FIG. 1 and FIG. 4, the radiating section closest to the collaboration portion 160 of the radiating portion 130 is the second radiating section 132, and the collaboration section closest to the second radiating section 132 of the collaboration portion 160 is the first collaboration section 161. The first collaboration section 161 is specifically rectangular, and the length L of the first collaboration section 161 along the first direction x is greater than the length thereof along the third direction z. The gap (that is, the gap length) between the first collaboration section 161 and the second radiating section 132 along the third direction z is G1, which can satisfy the following condition: 0.1≤mm≤G1≤0.9 mm. In this way, the antenna structure 100 meeting the required characteristics can be effectively designed by adjusting the gap G1. Furthermore, the gap G1 and the length L can satisfy the following condition: 0.02≤G1/L≤0.095, so that the antenna structure according to the present disclosure can be applied to any desired frequency and dielectric material.

Figure 7:
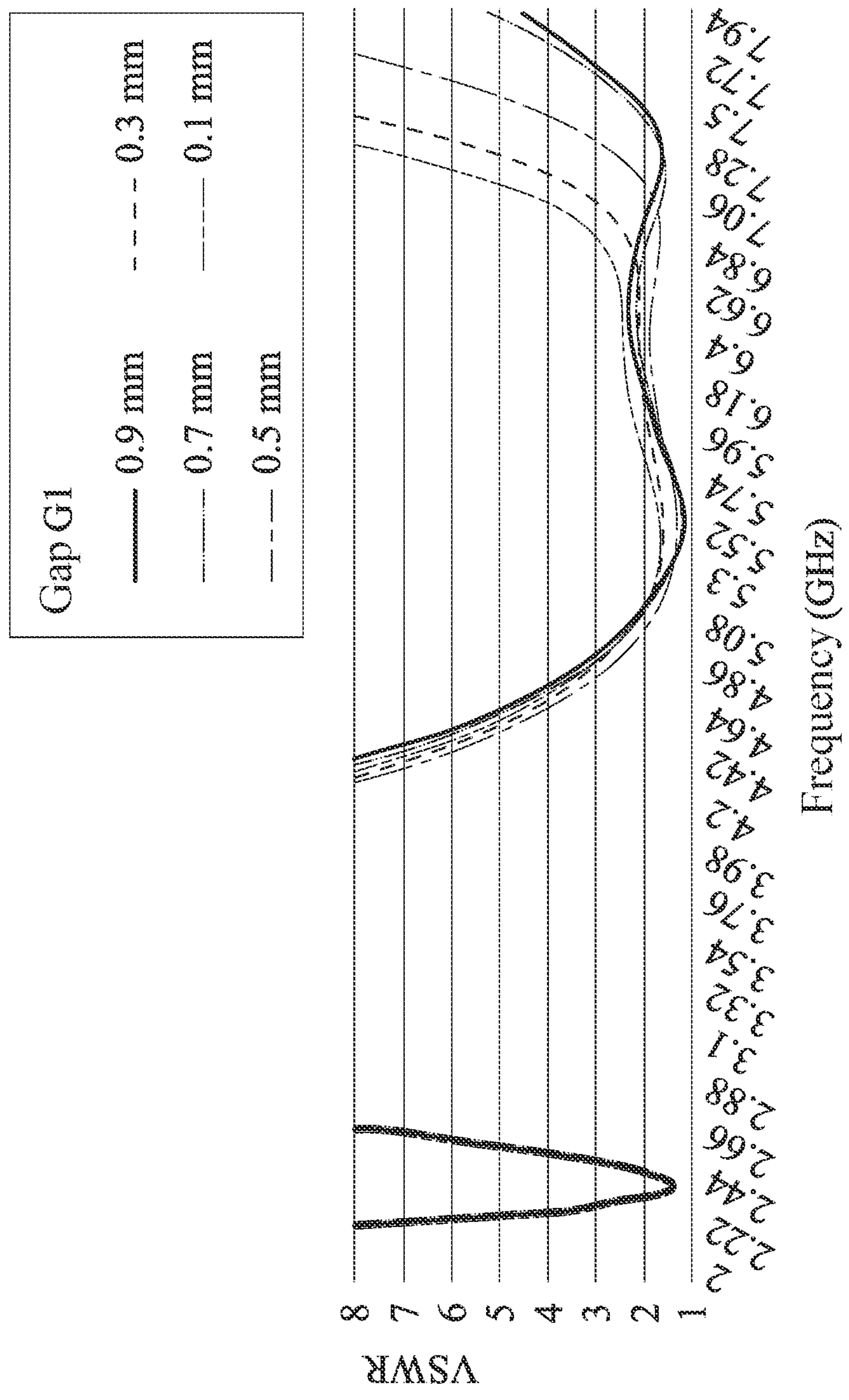
FIG. 7 is another frequency response diagram of the antenna structure in the embodiment of FIG. 1.

FIG. 7 shows another frequency response diagram of the antenna structure 100 in the embodiment of FIG. 1. Specifically, it is a diagram of the relationship between the frequency and the voltage standing wave ratio of the antenna structure 100 under different gaps G1. Referring to FIGS. 1 and 7, the coupling amount and coupling characteristics between the first collaboration section 161 and the second radiating section 132 are related to the gap G1 along the third direction z therebetween. According to a specific configuration of this embodiment, when the dielectric material of the antenna structure 100 is air, the length M1 is 26.05 mm, the length M2 is 6.05 mm, the length L is 4.5 mm, the gap G2 is 0.5 mm, and the adjusted gap G1 is 0.5 mm, at this time, the antenna structure 100 has better impedance matching and lower voltage standing wave ratio between 5.85 GHz and 7.125 GHz.

Please refer to FIGS. 1 and 4, the gap along the first direction x between the collaboration portion 160 and the second connecting section 152 provided with the feeding port 170 is G2, which can meet the following condition: 0.3 mm≤G2≤0.7 mm. In this way, the antenna structure 100 meeting the required characteristics can be designed by adjusting the gap G2. Furthermore, the gap G2 and the length L can satisfy the following condition: 0.06≤G2/L≤0.08, so that the antenna structure according to the present disclosure can be applied to any desired frequency and dielectric material.

Figure 8:
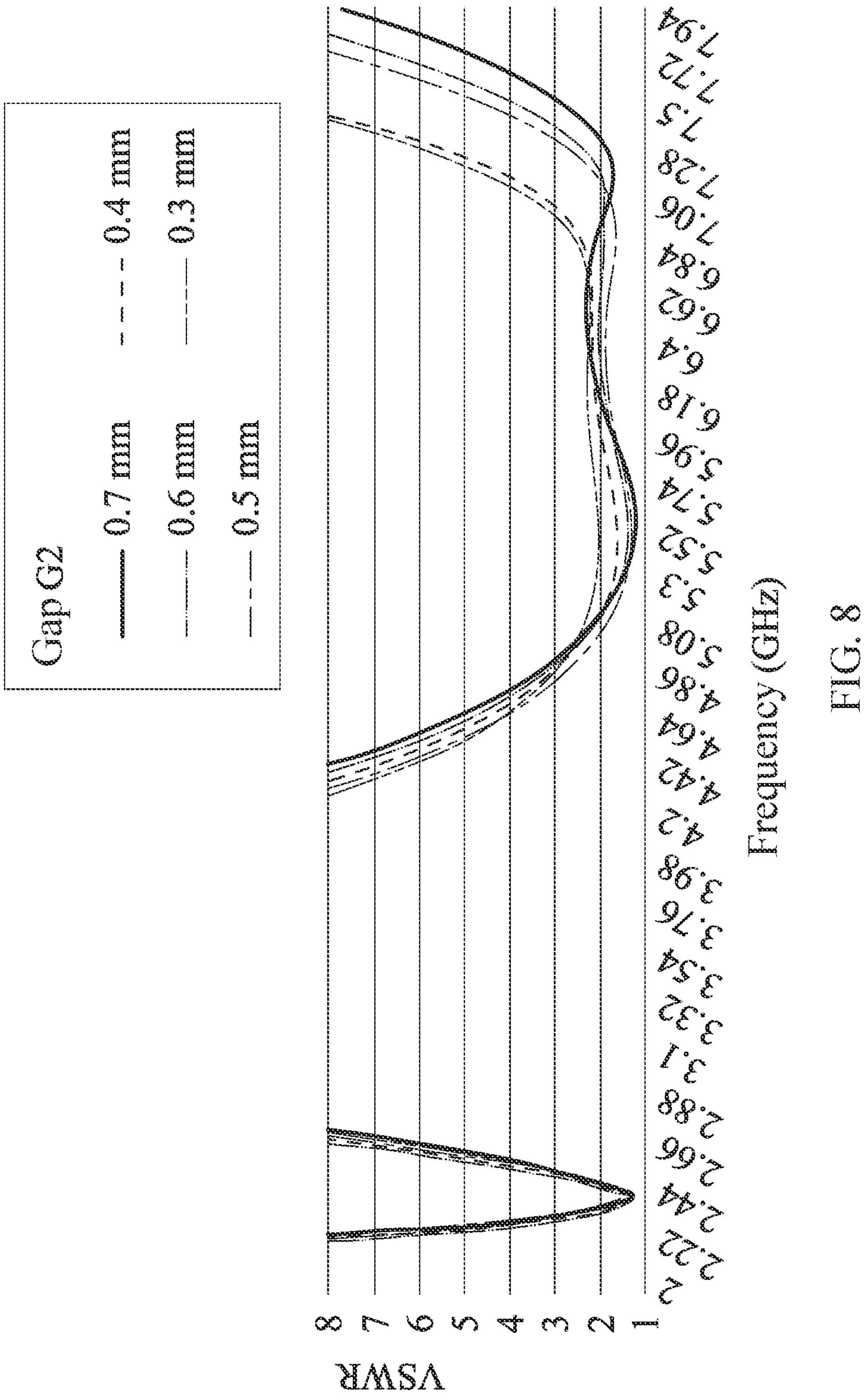
FIG. 8 is further another frequency response diagram of the antenna structure in the embodiment of FIG. 1.

FIG. 8 shows further another frequency response diagram of the antenna structure 100 in the embodiment of FIG. 1, specifically, the relationship diagram between the frequency and the voltage standing wave ratio of the antenna structure 100 under different gaps G2. Referring to FIGS. 1 and 8, the coupling amount and coupling characteristics between the first collaboration section 161 and the second connecting section 152 provided with the feeding port 170 are related to the gap G2 along the first direction x therebetween. According to a specific configuration of this embodiment, when the dielectric material of the antenna structure 100 is air, the length M1 is 26.05 mm, the length M2 is 6.05 mm, the length L is 4.5 mm, the gap G1 is 0.5 mm, and the adjusted gap G2 is 0.5 mm, at this time, the antenna structure 100 has better impedance matching and a lower voltage standing wave ratio between 5.85 GHz and 7.125 GHz.

According to an embodiment of the present disclosure, when any one of a radiating portion, a grounding portion, a connecting portion, and a collaboration portion includes at least two sections (i.e., plural regions) and is flat-board-shaped. The two sections can be respectively arranged on different planes in physical connections with each other. For example, the first grounding section 141 and the second grounding section 142 are perpendicular to each other. The two sections can also be arranged on the same plane, but the electromagnetic radiation modes and characteristics of the two sections are different. For example, the length of the structural junction between the first radiating section 131 and the second radiating section 132 along the second direction y has a discontinuous change, and the length of the first radiating section 131 along the second direction y is greater than the length of the second radiating section 132 along the second direction y, so the first radiating section 131 and the second radiating section 132 are configured to generate different frequency modes related to the lengths M1 and M2, respectively, along the first direction x.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a radiating portion comprising a first radiating section and a second radiating section, the first radiating section and the second radiating section being arranged along a first direction, and a length of the first radiating section along the first direction being greater than a length of the second radiating section along the first direction;

a grounding portion;

a connecting portion, electrically connected between the radiating portion and the grounding portion, the first radiating section and the second radiating section being extended in opposite directions from the connecting portion, the connecting portion comprising a first connecting section and a second connecting section, the first connecting section and the second connecting section being arranged in the first direction and electrically connected, and the second connecting section provided for a feeding port to be disposed thereon for feeding a signal to the antenna structure; and a collaboration portion, electrically connected to the grounding portion, the collaboration portion coupling to the second radiating section and the connecting portion, the collaboration portion and the radiating portion being separated from each other, and the collaboration portion and the connecting portion being separated from each other;

wherein the grounding portion, the first connecting section and the second connecting section are electrically connected in sequence, a part of the second connecting section is located closer to the grounding portion than a part of the first connecting section thereto, and the second connecting portion is located closer to the collaboration portion than the first connecting section thereto.

2. The antenna structure of claim 1, wherein the grounding portion comprises a first grounding section and a second grounding section, and the first grounding section and the second grounding section are directly electrically connected and perpendicular to each other.

3. The antenna structure of claim 2, wherein each of the radiating portion, the first grounding section, the second grounding section, the connecting portion, and the collaboration portion is flat-board-shaped and is made of metal material.

4. The antenna structure of claim 3, wherein a normal direction of each of the connecting portion, the collaboration portion and the second grounding section is parallel to a second direction, the connecting portion, the collaboration portion and the second grounding section are arranged on a same plane, a normal direction of each of the radiating portion and the first grounding section is parallel to a third direction, and the first direction, the second direction and the third direction are perpendicular to each other.

5. The antenna structure of claim 4, wherein the collaboration portion is located correspondingly to the second radiating section along the first direction, and a length of the collaboration portion along the first direction is L, which satisfies the following condition: 4 mm≤L≤10 mm.

6. The antenna structure of claim 5, wherein a gap along the third direction between the collaboration portion and the second radiating section is G1, which satisfies the following condition: 0.1 mm≤G1≤0.9 mm.

7. The antenna structure of claim 1, wherein a gap along the first direction between the collaboration portion and the second connecting section is G2, which satisfies the following condition: 0.3 mm≤G2≤0.7 mm.

8. An antenna structure, comprising:

a radiating portion, comprising two radiating sections, and the two radiating sections being arranged along a first direction;

a grounding portion;

a connecting portion, electrically connected between the radiating portion and the grounding portion, the connecting portion provided for a feeding port to be disposed thereon for feeding a signal to the antenna structure, and the two radiating sections being extended in opposite directions from the connecting portion; and a collaboration portion, electrically connected to the grounding portion;

wherein each of the radiating portion, the grounding portion, the connecting portion, and the collaboration portion is made of metal material, the connecting portion and the collaboration portion are flat-board-shaped, a normal direction of each of the connecting portion and the collaboration portion is parallel to a second direction, at least a part of the grounding portion and the radiating portion are flat-board-shaped, a normal direction of each of the at least a part of the grounding portion and the radiating portion is parallel to a third direction, and the first direction, the second direction and the third direction are perpendicular to each other;

wherein the collaboration portion is coupling to the radiating portion and the connecting portion, the collaboration portion and the radiating portion are separated from each other, the collaboration portion and the connecting portion are separated from each other, one radiating section of the radiating portion that is closest to the collaboration portion comprises an open segment extending from a junction between the radiating section and the connecting portion to an open end, and a length of the open segment along the first direction is less than a length of the collaboration portion along the first direction.

9. The antenna structure of claim 8, wherein a gap along the third direction between the collaboration portion and the radiating section of the radiating portion that is closest to the collaboration portion is G1, and the length of the collaboration portion along the first direction is L, which satisfy the following condition: 0.02≤G1/L≤0.095.

10. The antenna structure of claim 8, wherein a gap along the first direction between the collaboration portion and connecting portion is G2, and the length of the collaboration portion along the first direction is L, which satisfy the following condition: 0.06≤G2/L≤0.08.

* * * * *